(No Model.) 3 Sheets—Sheet 1.
H. BODE.
CAMERA APPARATUS, SLIDE, AND EXTENSION BED.
No. 443,610. Patented Dec. 30, 1890.
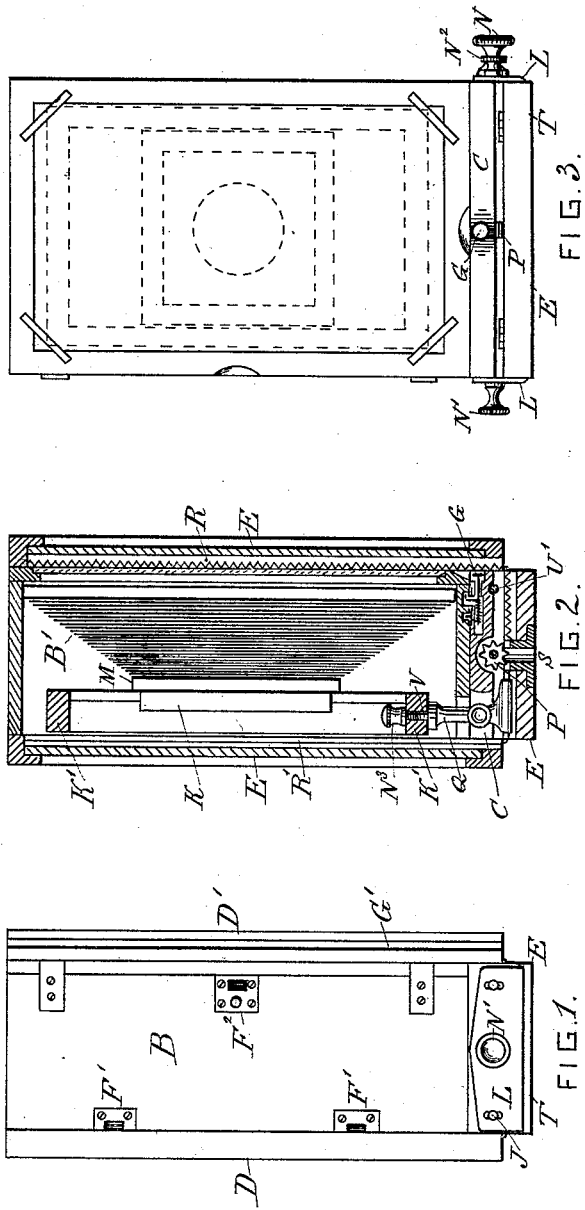
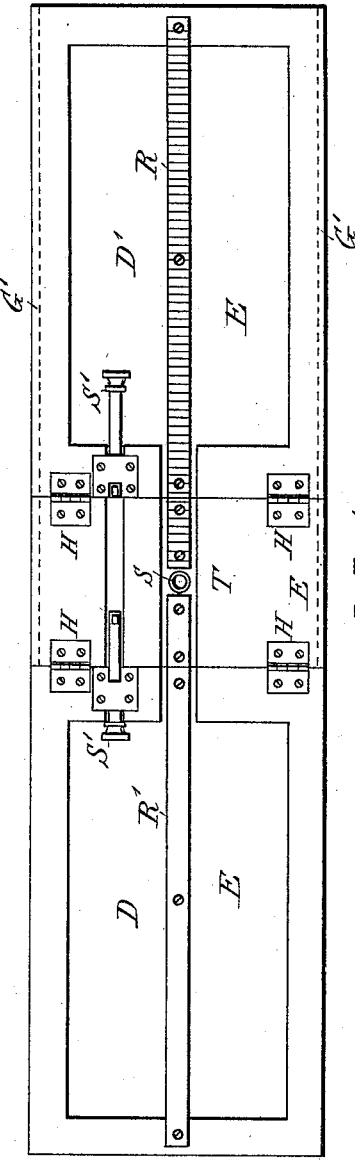
WITNESSES
W. H. Lowe
Edward S. Berrall.
INVENTOR
Henry Bode

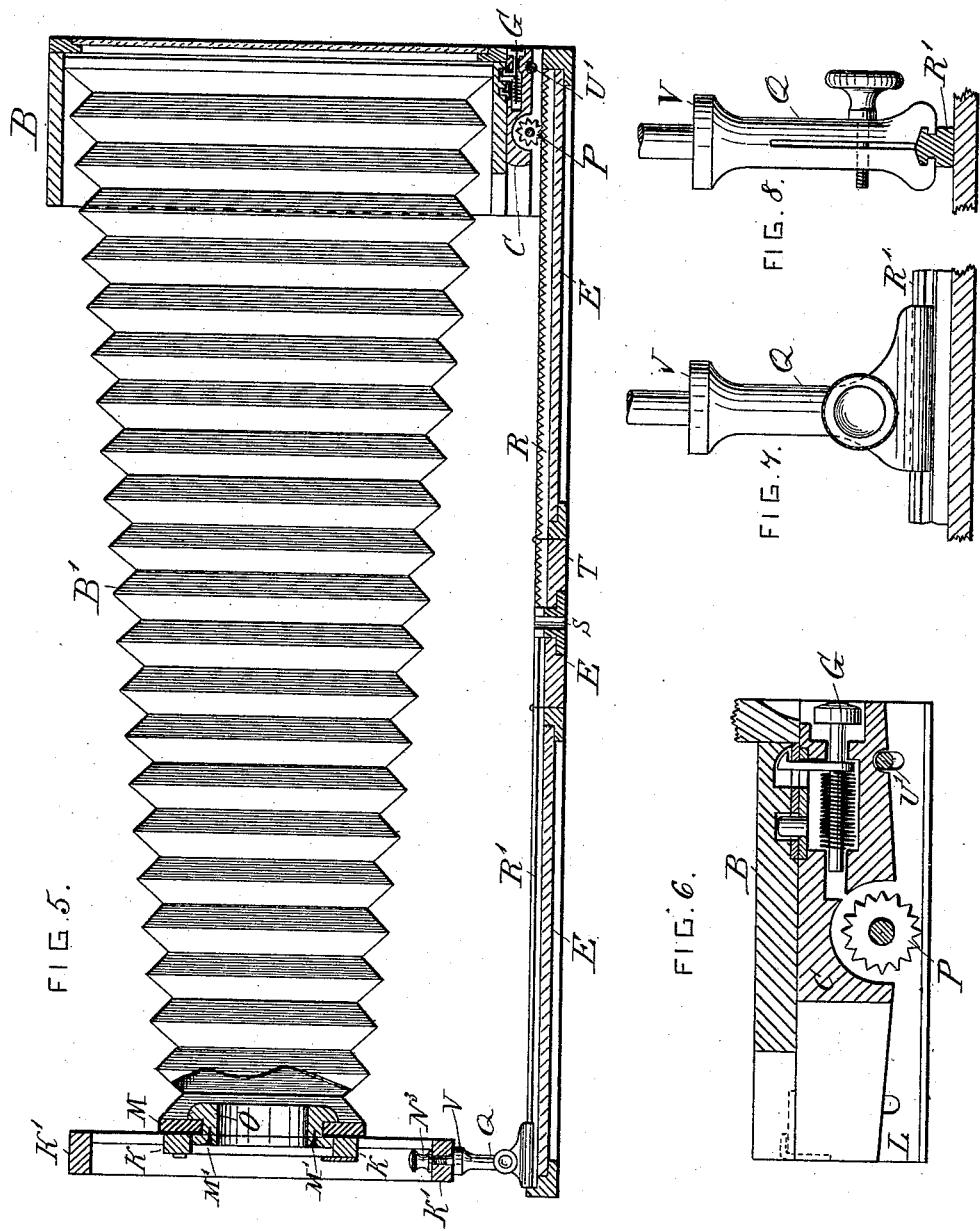

(No Model.) 3 Sheets—Sheet 3.
H. BODE.
CAMERA APPARATUS, SLIDE, AND EXTENSION BED.
No. 443,610. Patented Dec. 30, 1890.
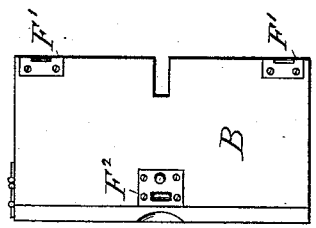
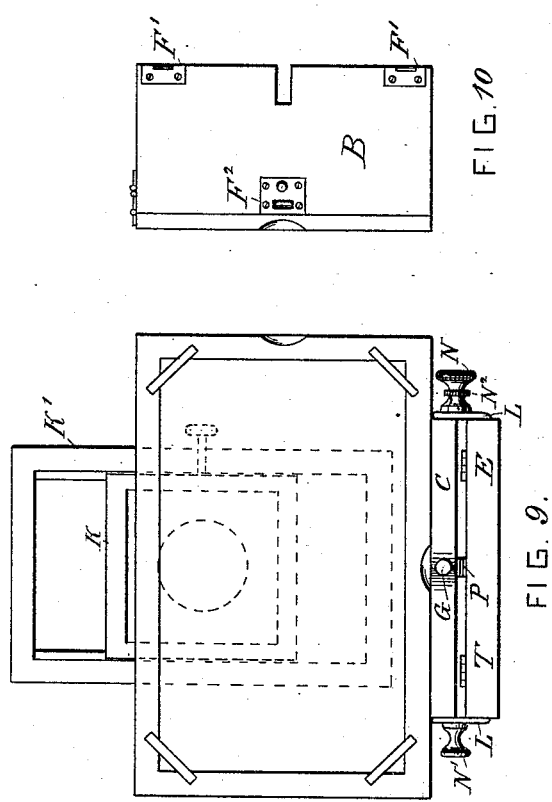
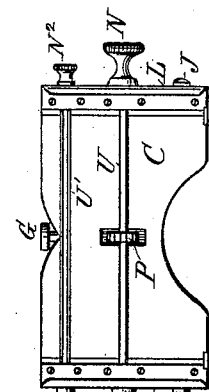
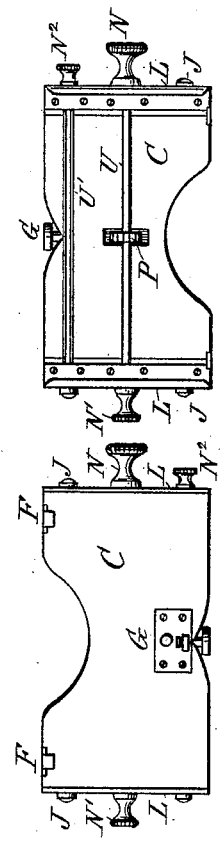
WITNESSES
W. H. Lowe
Edward D. Berrall.
INVENTOR
Henry Bode

UNITED STATES PATENT OFFICE.

HENRY BODE, OF NEW YORK, N. Y.

CAMERA APPARATUS, SLIDE, AND EXTENSION-BED.

SPECIFICATION forming part of Letters Patent No. 443,610, dated December 30, 1890.

Application filed March 3, 1890. Serial No. 342,391. (No model.)

*To all whom it may concern:*

Be it known that I, HENRY BODE, a naturalized citizen of the United States, now residing at No. 274 West One hundred and thirty-first street, in the city, county, and State of New York, have invented a new and useful Camera Apparatus, Slides, Extension-Bed, &c., (for which I have obtained no Letters Patent whatever,) of which the following is a specification.

My invention relates to an extension-bed for a camera; to the methods of supporting, moving, and fastening the box part of the camera and its attachments in different positions; to the balanced back or support of the camera-box and its operating devices; to the extension-front and its devices for extension, its swiveling and raising devices, and the center slide and clamps supporting the same with the front end of the bellows and the lens-holding frame, and to the devices and combination of devices connected therewith.

The invention consists in the combination of elements stated in the claims, forming a part of this specification.

The objects of the invention are, first, to provide means for obtaining the longest possible focus and extension-bed with smallest and most compact box in which the bellows and other details may be inclosed; second, to provide means for easily shifting the box from the vertical to the horizontal position for the purpose of taking long and narrow views or short and wide views at will; third, to provide a balanced back, rest, support, and means of secure fixture for the camera-box, and, fourth, to provide means for readily moving the camera front and lens back and forth, and also for swiveling the same to either side at will. I attain these objects by the mechanism illustrated in the accompanying three sheets of drawings, in which—

Figure 1 is a side view of the camera-box inclosing the bellows. Fig. 2 is a central vertical sectional view of the same. Fig. 3 is a back view of the camera-box opened, of the balanced back on which it rests, and of the extension-slide. Fig. 4 is a top view or plan of the extension-bed. Fig. 5 is a part sectional and part perspective view of the whole apparatus. Fig. 6 is an enlarged vertical sectional view of the bottom of the camera-box and balanced back or rest with the fastenings for securing the same together. Figs. 7 and 8 are side and front views, respectively, of the central double slide clamp and guide and lens-support. Fig. 9 is a back view of the camera-box opened and secured on the balanced back or rest and extension-bed with the box in a horizontal position. Fig. 10 is a bottom end view of the camera-box and detail appliances for securing the box to the balanced back or rest, and Figs. 11 and 12 are top and bottom views of the balanced bed and operating attachments.

Similar letters refer to similar parts throughout the several views.

The camera-box B is provided with doors or flaps D and D', which are secured by hinges to the tripod-plate T. The doors or flaps D and D' and the tripod-plate T constitute the extension-bed E. D' is provided with a rack R, which, with a division at the joint between D' and T, extends nearly to the center of the tripod-plate T adjacent to the tripod-socket S. This rack receives the toothed wheel P for the purpose of regulating the position of the box B. D is provided with a central guide-rail R', similarly divided and similarly extending nearly to the tripod-socket in the tripod-plate. Slide-bolts S' S' co-operate with the hinges H to secure the three parts D, D', and T firmly together when extended and also to permit the flaps D and D' to be folded up against the front and rear ends of the camera-box containing the bellows and the attached parts when in a state of collapse or when compressed. The tripod-plate T is made sufficiently large to hold the bellows, the front or lens plate, and the ground-glass plate when not extended, so that the flaps D and D' when folded up into place will complete the box B by supplying the two ends or sides of the same. The pinion P, so located as to take in the rack R, is secured on the rod U, operated by the thumb-nut N. On the other end of the rod U is the thumb-nut N', by means of which the two slide-plates L L are forced toward each other and into the grooves G' G', in which they slide in the usual way in the edges of D, and the pinion P is held stationary, so as to aid in maintaining the camera-box in a fixed position. The rod U is the bearing on which the balanced back C moves. This balanced back is to some extent held by means of the thumb-nuts N and N′, but more particularly by the thumb-nut N² on the rod U′, which is provided with a head on its opposite end, and thereby clamps the two slide-plates L against the ends of the balanced back C. The back C is provided with the two hooks F, which engage with the hook-plates F′ F′ and also with the spring catch and stop G, which engage with a suitable plate F² on the lower end and side of the camera-box. The slide-plates L are each provided with two slots, one at each end, to permit the balanced motion of the balanced back C, and the two front ones receive the screws J J, under the heads of which washers or plates may be placed to assist in holding the balanced back in any desired position.

B′ is the usual bellows and is secured at the large end to the back interior of the camera-box and at the small end or front to a perforated plate M, engaged by the ring O, which is held to the front plate M′ by screws or in any usual way. The plate M′, the ring O, and the plate M are secured in a square frame K, which is provided with the usual means for holding the lens apparatus and moves up and down in the outside frame K′ on or in suitable guides. When the camera-box B is placed on the side, as shown in Fig. 9, the bellows B′ is turned at right angles to the position shown in Fig. 5, turning at the front on the ring O, provided for that purpose. The double screw-clamp Q engages with the guide-rail R′, and thereby the front end of the bellows and the lens may be held in any fixed position desired in relation to the extension-bed and the camera-box at the other end of the extension-bed. This double screw-clamp is provided at the top with a threaded extension rod or stem, which passes through the bottom of the frame K′ and is provided with a thumb-nut N³. The bottom of the frame K′ rests upon the shoulder V at the top of the screw-clamp, and may be fixed in any position or released therefrom by moving the thumb-nut N³.

I claim as my invention—

1. The extension camera-bed E, consisting of the parts T, D, and D′, in combination with the box B and forming three inclosing sides of the same.

2. The box B, bellows B′, and its immediate attachments, in combination with the tripod-plate T and flaps D and D′.

3. The tripod-plate T and the end plates D and D′, in combination with the balanced back C.

4. The tripod-plate T and the end plates D and D′, in combination with the balanced back C and the camera-box B.

5. The tripod-plate T and the end plates D and D′, in combination with the balanced back C, the camera-box B, and the bellows B′ and its attachments.

6. In combination, the tripod-plate T, the end plates D and D′, forming an extension-bed, and the slide-bolts S′ S′.

7. The balanced back plate C, the rods U and U′, the slide-plates L L, and thumb-nuts N, N′, and N², in combination.

8. The balanced back plate C, provided with the two hooks F F and the locking mechanism G.

9. The balanced back plate C, provided with the two hooks F F and the lock mechanism G, in combination with the hook-plates F′ F′ and F².

10. In combination, the central guide-rail R′, double screw-clamp Q, frame K′, and thumb-nut N³.

HENRY BODE.

Witnesses:
WM. A. LOWE,
EDWARD S. BERRALL.